(12) United States Patent
Oshoniyi

(10) Patent No.: US 11,931,883 B1
(45) Date of Patent: Mar. 19, 2024

(54) REACH EXTENDING TOOL SYSTEM

(71) Applicant: EDDIE N SONS INVESTMENTS LLC, Alpharetta, GA (US)

(72) Inventor: Atilade Olufemi Oshoniyi, Alpharetta, GA (US)

(73) Assignee: EDDIE N SONS INVESTMENTS LLC, Alpharetta, GA (US)

( * ) Notice: Subject to any disclaimer, the term of this patent is extended or adjusted under 35 U.S.C. 154(b) by 0 days.

(21) Appl. No.: 18/131,938

(22) Filed: Apr. 7, 2023

(51) Int. Cl.
| *B25J 1/02* | (2006.01) |
| *B25J 1/04* | (2006.01) |
| *B25J 11/00* | (2006.01) |

(52) U.S. Cl.
CPC . *B25J 1/02* (2013.01); *B25J 1/04* (2013.01); *B25J 11/008* (2013.01)

(58) Field of Classification Search
CPC .............. B25J 1/02; B25J 1/04; B25J 11/008
See application file for complete search history.

(56) References Cited

U.S. PATENT DOCUMENTS

| 4,225,174 | A | * | 9/1980 | Hennessy | ............. | E01H 1/1206 |
| | | | | | | 294/1.4 |
| 6,145,154 | A | | 11/2000 | Blair | | |
| 6,513,844 | B1 | | 2/2003 | Hsu | | |
| 6,830,552 | B1 | | 12/2004 | Gonzalez | | |
| 6,874,833 | B2 | | 4/2005 | Keith et al. | | |
| 8,875,337 | B2 | | 11/2014 | Tacoma | | |
| 9,132,544 | B2 | * | 9/2015 | Levkus | ................. | E01H 1/1206 |
| D777,977 | S | | 1/2017 | Lowe | | |
| 10,012,342 | B2 | | 7/2018 | Chen | | |
| 10,328,568 | B1 | | 6/2019 | Scibilio | | |
| 10,500,715 | B1 | * | 12/2019 | Fleming | ................... | B25J 18/04 |
| 2004/0080169 | A1 | * | 4/2004 | Khubani | ................... | B25J 21/02 |
| | | | | | | 294/111 |
| 2004/0135387 | A1 | * | 7/2004 | Keith | ........................ | B25J 1/02 |
| | | | | | | 294/209 |
| 2006/0053574 | A1 | | 3/2006 | Steinberg | | |
| 2021/0245361 | A1 | * | 8/2021 | Smith | ........................ | B25J 1/02 |
| 2022/0241957 | A1 | | 8/2022 | Li | | |
| 2022/0274265 | A1 | | 9/2022 | Bomsztyk et al. | | |

FOREIGN PATENT DOCUMENTS

| CA | 2353204 | 1/2003 |
| CN | 108453691 | 8/2018 |
| CN | 111283649 | 6/2020 |

* cited by examiner

*Primary Examiner* — Stephen A Vu
(74) *Attorney, Agent, or Firm* — The Concept Law Group, PA; Scott D. Smiley; Scott M. Garrett

(57) ABSTRACT

A reach extending tool includes a grasping section at one end of a tubular body opposite a handle end of the reach extending tool. The grasping section includes a pair of grasping extensions that can be used to grasp and object, including any one of several accessories that are configured to mechanically interface with the grasping extensions. The length between the handle and the grasping section can by adjusted by partially folding the body at an elbow joint.

10 Claims, 17 Drawing Sheets

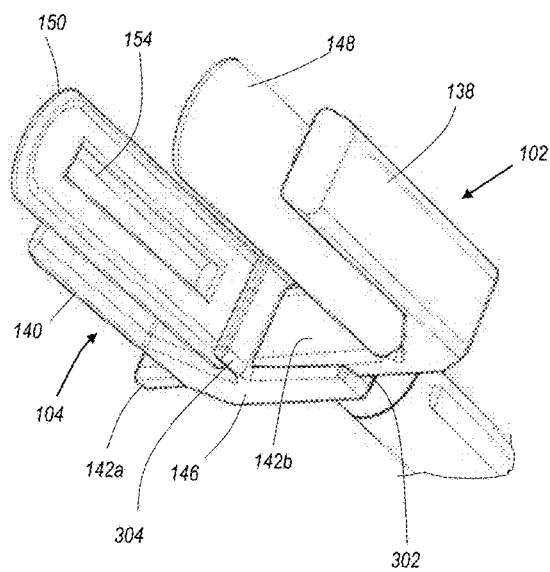
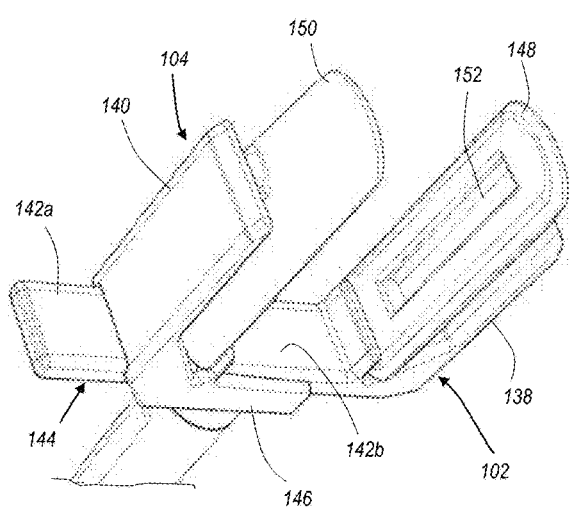
FIG. 4A                    FIG. 4B

202

204

206

REACH EXTENDING TOOL SYSTEM

FIELD OF THE INVENTION

The present invention relates generally to a reach extending tool system, and, more particularly, relates to a reach extending tool that includes a hinge joint, and an array of end effectors that all fit in the terminal grasping mechanism of the reach extending tool.

BACKGROUND OF THE INVENTION

Reach extending tools are in widespread use and have been found to be quite useful to assist people in reaching items manipulating them. A typical reach extending tool has a grasping mechanism at one end, and a handle for operating the grasping mechanism at the other end of an elongated body. Thus, the user can position the grasping elements on opposite sides of an item or object, and operate the handle mechanism to cause the grasping elements to close together against the opposite sides of the item. Once the grasping elements have secured the item, the user can then move the tool to move the item. Common applications include picking items up off the ground/floor, and reaching items on high shelves.

One of the problems with ordinary reach extending tools is that they have a fixed length and a fixed angle between the grasping end and the handle end. Thus, for example, if a person grasps something on the ground/floor, they must raise the handle end up high, possibly over their end, for their other hand to grab what the grasping end is holding. Similarly, this typical configuration makes it un-useful for self-care. For example, if a person needs to reach their own back (of their torso), even for something as simple as scratching their own back, the ergonomic configuration of the typical reach extending tools are not optimal for such uses.

Therefore, a need exists to overcome the problems with the prior art as discussed above.

SUMMARY OF THE INVENTION

In accordance with some embodiments of the inventive disclosure, there is provided a reach extending tool system that includes a body section having a grasping end opposite a handle end. There is also a fixed grasping extension attached to the body section at the grasping end of the body section and which is fixed to the body section at the grasping end, and a moveable grasping extension at the grasping end of the body section that is moveable relative to the fixed grasping extension. There is also a handle at the handle end including a trigger that is operable coupled to the moveable grasping extension wherein the moveable grasping extension moves toward the fixed grasping extension when the trigger is pulled.

In accordance with a further feature, the body section includes a first section and a second section joined at an elbow joint.

In accordance with a further feature, the elbow joint includes a knob that can tighten the elbow joint to fix the first section and second section in position relative to each other, and which can also be loosened to allow the first section and the second section to move relative to each other at the elbow joint.

In accordance with a further feature, the handle end includes a locking button operable, when pressed, to hold the moveable grasping extension in place.

In accordance with a further feature, the fixed grasping extension and the movable grasping extension each comprise a grasping pad, each grasping pad having a face that is planar, and wherein the face of the grasping pad on the fixed grasping extension and the face of the grasping pad on the moveable extension oppose each other and are parallel, and wherein the faces remain parallel throughout a range of movement of the moveable grasping pad.

In accordance with a further feature, each of the grasping pads includes a recess formed in its face, wherein the recess is configured to hold a protrusion of an accessory therein.

In accordance with a further feature, there is further provided a cable disposed in the body section between the trigger and a gear at the grasping end that engages the moveable grasping section, wherein the trigger operates movement of the gear through the cable to cause the moveable grasping portion to move.

In accordance with some embodiments of the inventive disclosure, there is provided a reach extending tool system that includes both a reach extending tool and at least one accessory. The reach extending tool includes a body section that has a first section and a second section. The body section also has a grasping end and a handle end opposite the grasping end. The first section and second section are joined together at an elbow joint between the handle end and the grasping end. The elbow joint selectively allows the first section and second section to move relative to each other about the elbow joint and alternatively to be fixed to each other so that the first section and the second section do not move relative to each other. The reach extending tool also has a fixed grasping extension that is mounted at the grasping end at a lateral support portion of the fixed grasping extension. The fixed grasping extension also has a forward extending portion that extends from the lateral support portion at a right angle, and a grasping pad mounted on the forward extending portion. The gasping pad has a recess formed in a face of the grasping pad. The reach extending tool also has a moveable grasping extension that has a lateral section that is mounted in the lateral support portion of the fixed grasping extension. The moveable grasping extension also has a forward extending portion that extends from the lateral section of the moveable grasping extension at a right angle to the lateral section of the moveable grasping extension, and parallel to the forward extending portion of the fixed grasping extension. The moveable grasping extension also has a grasping pad mounted on the forward extending portion of the moveable grasping extension, and the grasping pad has a recess formed in a face of the grasping pad. The face of the grasping pad of the moveable grasping extension is parallel with the face of the grasping pad of the fixed grasping extension, and has a recess formed in the face of the grasping pad of the moveable grasping extension. The reach extending tool also has a trigger at the handle end that is operably coupled to the grasping end and is operable to move the moveable grasping extension toward the fixed grasping extension upon being pressed. The at least one accessory is configured to be held between the grasping pad of the fixed grasping extension and the grasping pad of the moveable grasping extension, and includes a protrusion on a first side of the at least one accessory that fits into the recess of one of the grasping pads and a protrusion at an opposite side of the at least one accessory that fits into the recess of the other grasping pad.

In accordance with a further feature, the at least one accessory is a back scratcher having a plurality of tines that extend from a body of the back scratcher.

In accordance with a further feature, the at least one accessory is a massager having a roller.

In accordance with a further feature, the at least one accessory is a lotion applicator.

Although the invention is illustrated and described herein as embodied in a reach extending tool system, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

"In the description of the embodiments of the present invention, unless otherwise specified, azimuth or positional relationships indicated by terms such as "up", "down", "left", "right", "inside", "outside", "front", "back", "head", "tail" and so on, are azimuth or positional relationships based on the drawings, which are only to facilitate description of the embodiments of the present invention and simplify the description, but not to indicate or imply that the devices or components must have a specific azimuth, or be constructed or operated in the specific azimuth, which thus cannot be understood as a limitation to the embodiments of the present invention. Furthermore, terms such as "first", "second", "third" and so on are only used for descriptive purposes, and cannot be construed as indicating or implying relative importance.

In the description of the embodiments of the present invention, it should be noted that, unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected, or may be indirectly connected via an intermediate medium. As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the article being referenced. The term "elongated" means a member or direction (e.g. "elongated direction") having a length that is much greater than its width, such that the length is at least three times that of the width in the perpendicular direction of the length or elongated direction. Those skilled in the art can understand the specific meanings of the above-mentioned terms in the embodiments of the present invention according to the specific circumstances.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

FIGS. 4A and 4B show left and right bottom front perspective views, respectively, of the grasping section of a reach extending tool, in accordance with some embodiments.

DETAILED DESCRIPTION

Figure 1A:
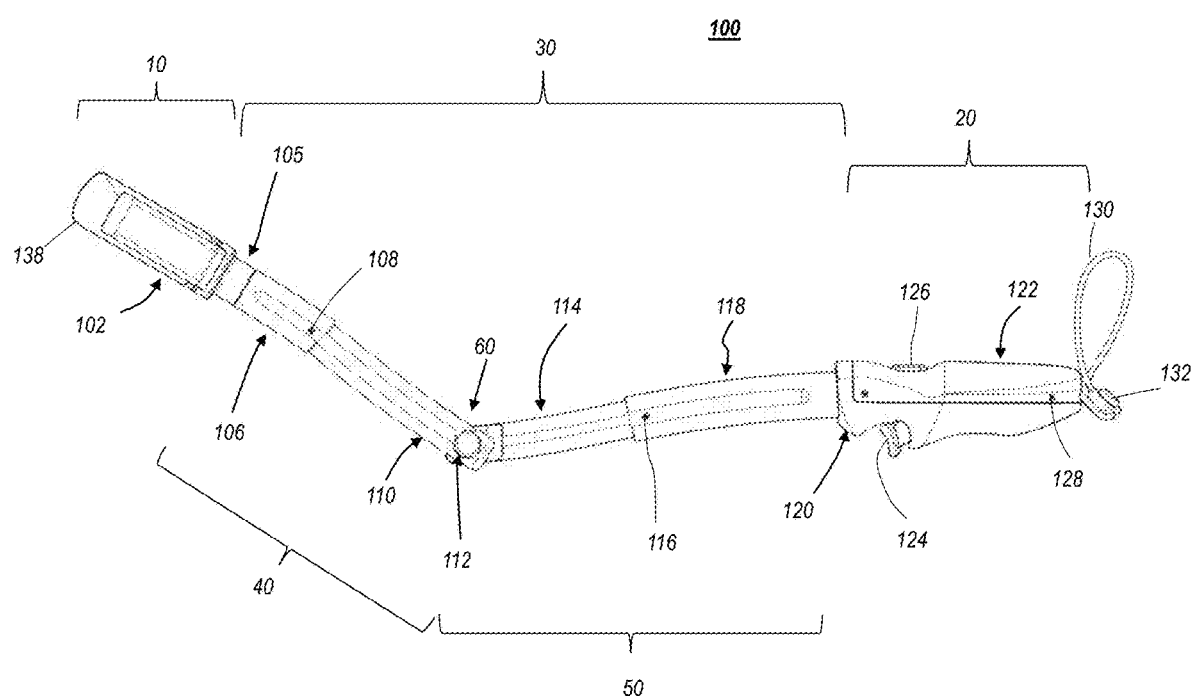
FIG. 1A is a left side elevational view of a reach extending tool, in accordance with some embodiments.
Figure 1B:
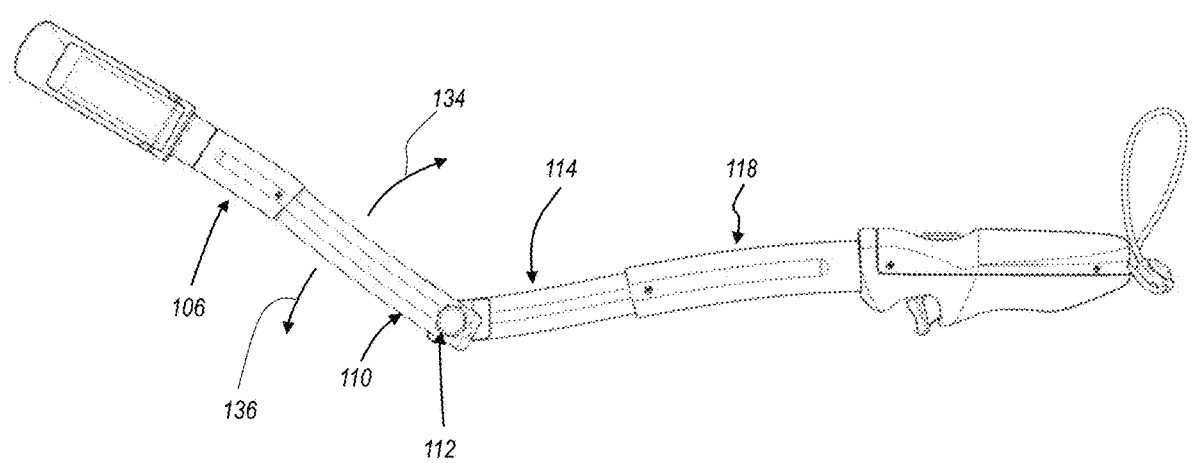
FIG. 1B is a left side elevational view of a reach extending tool indicating the articulation of the sections of the reach extending tool, in accordance with some embodiments.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The inventive disclosure describes both a reach extending tool, and a system of supplementary devices that allow some basic forms of self-care. The reach extending tool is configurable in angle, and therefor in length between the grasping end and the handle end, which allows a user to configure the reach extending tool to suit their particular needs.

Figure 2:
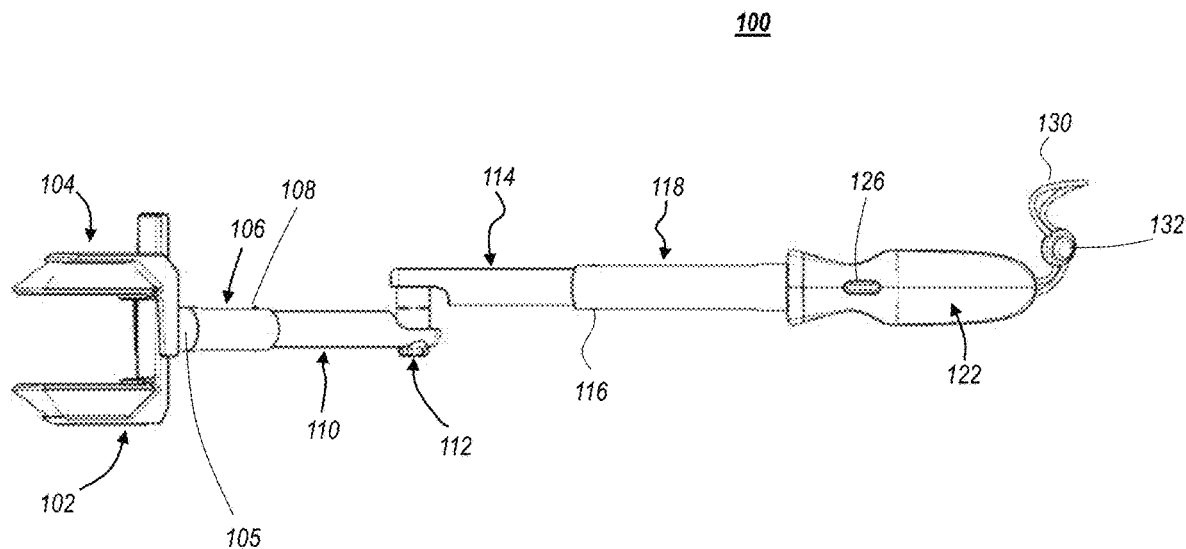
FIG. 2 is a top plan view of a reach extending tool, in accordance with some embodiments.
Figure 3:
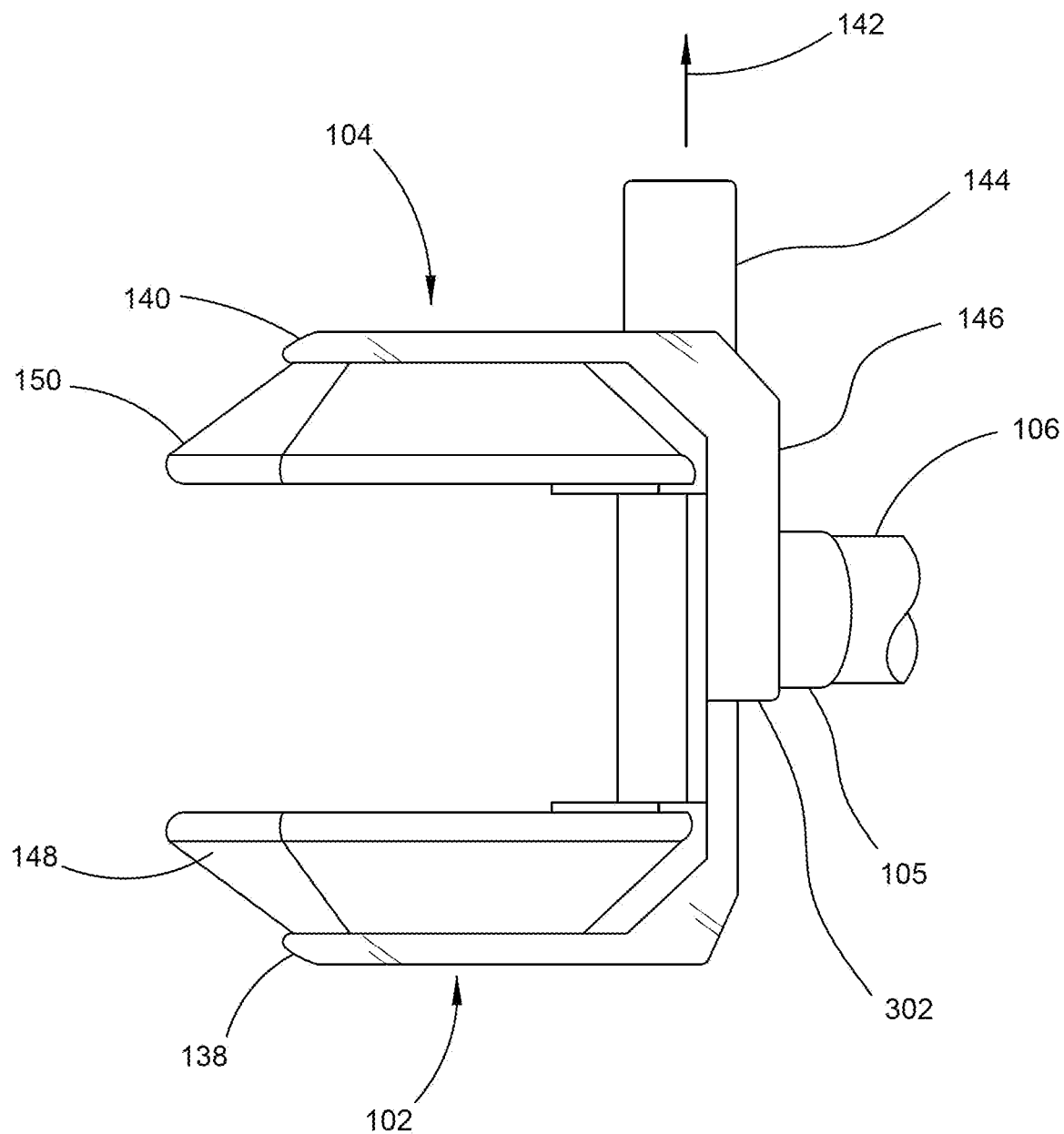
FIG. 3 is a detail top view of the grasping section of the reach extending tool, in accordance with some embodiments.
Figure 5:
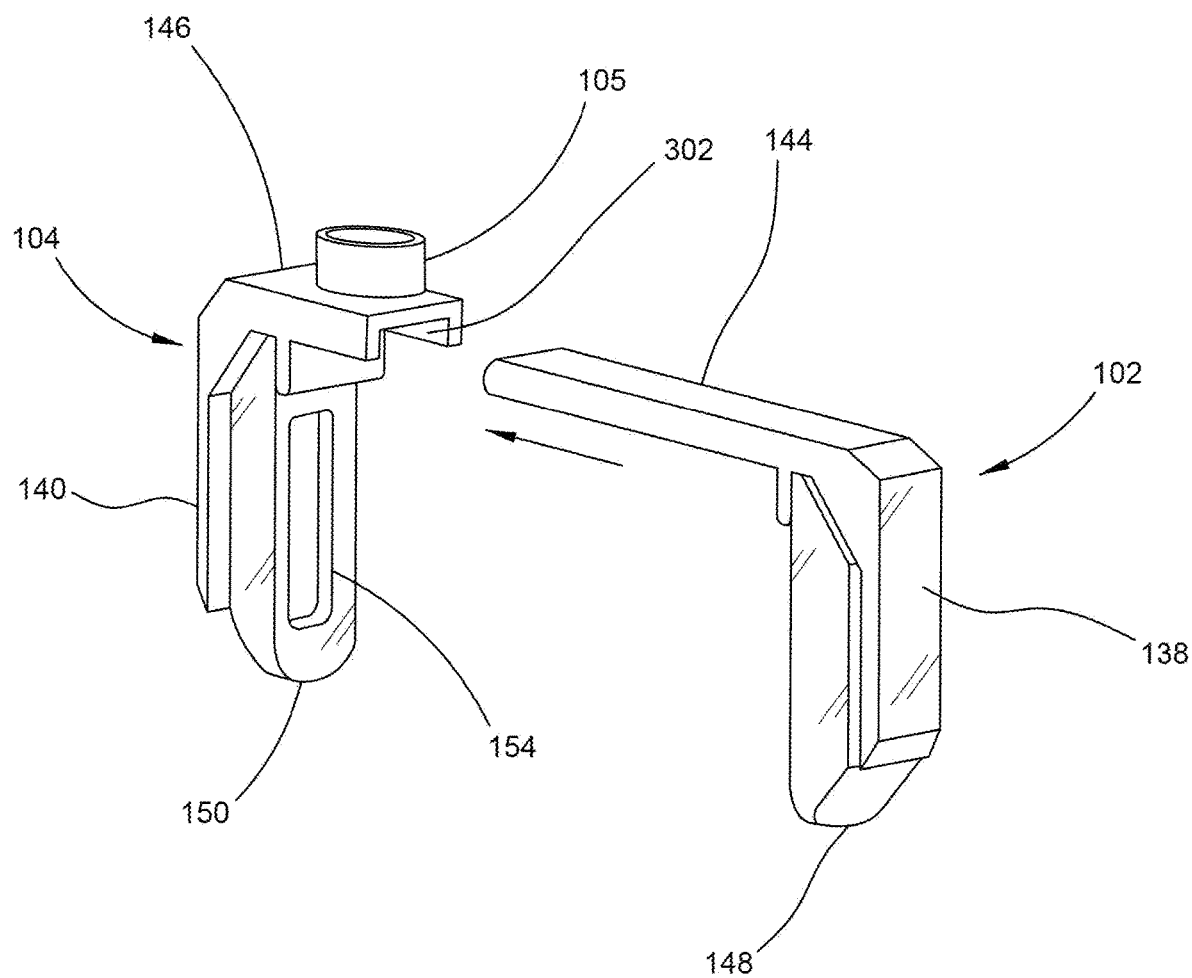
FIG. 5 is an exploded view of the grasping portion of a reach extending tool, in accordance with some embodiments.
Figure 6:
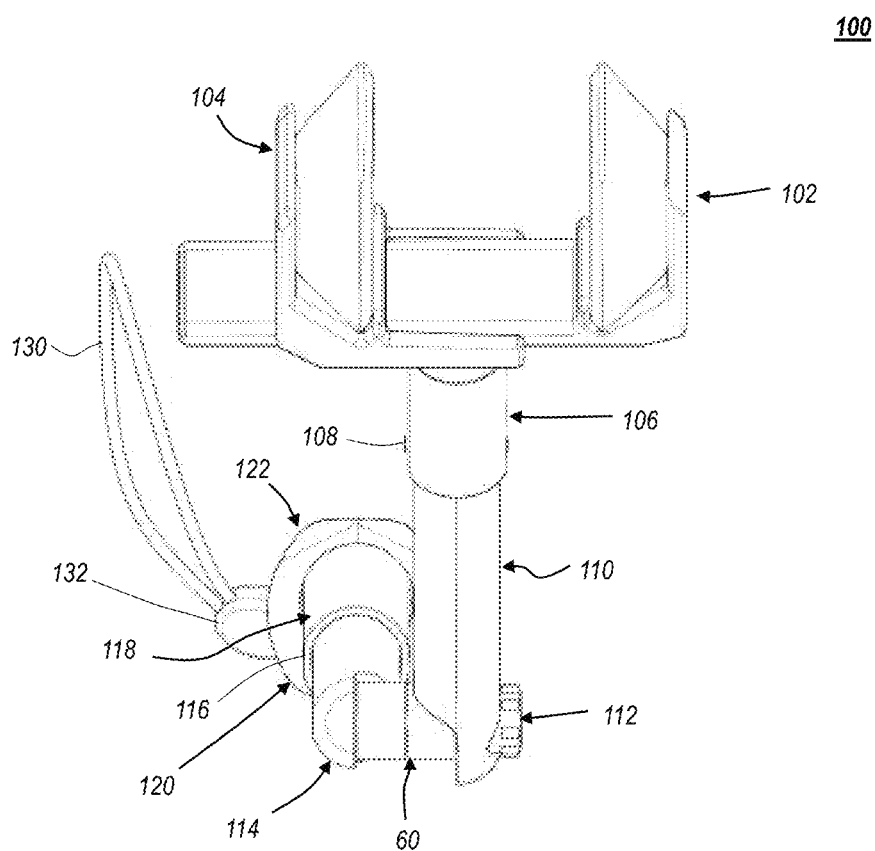
FIG. 6 is a front elevational view of a reach extending tool, in accordance with some embodiments.
Figure 7:
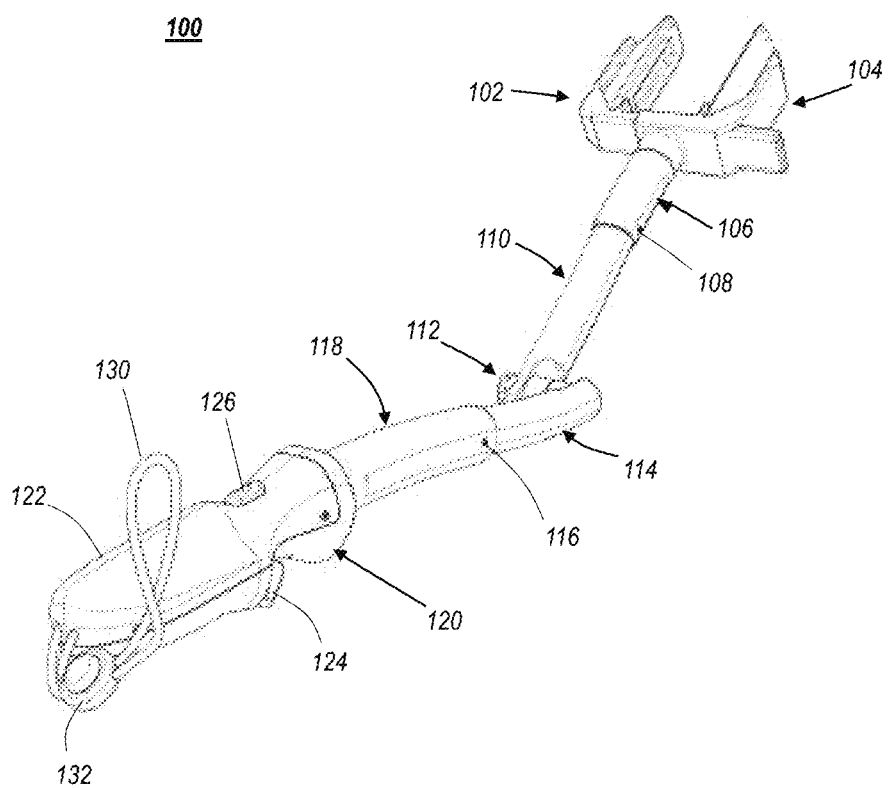
FIG. 7 is a rear right perspective view of a reach extending tool, in accordance with some embodiments.
Figure 8:
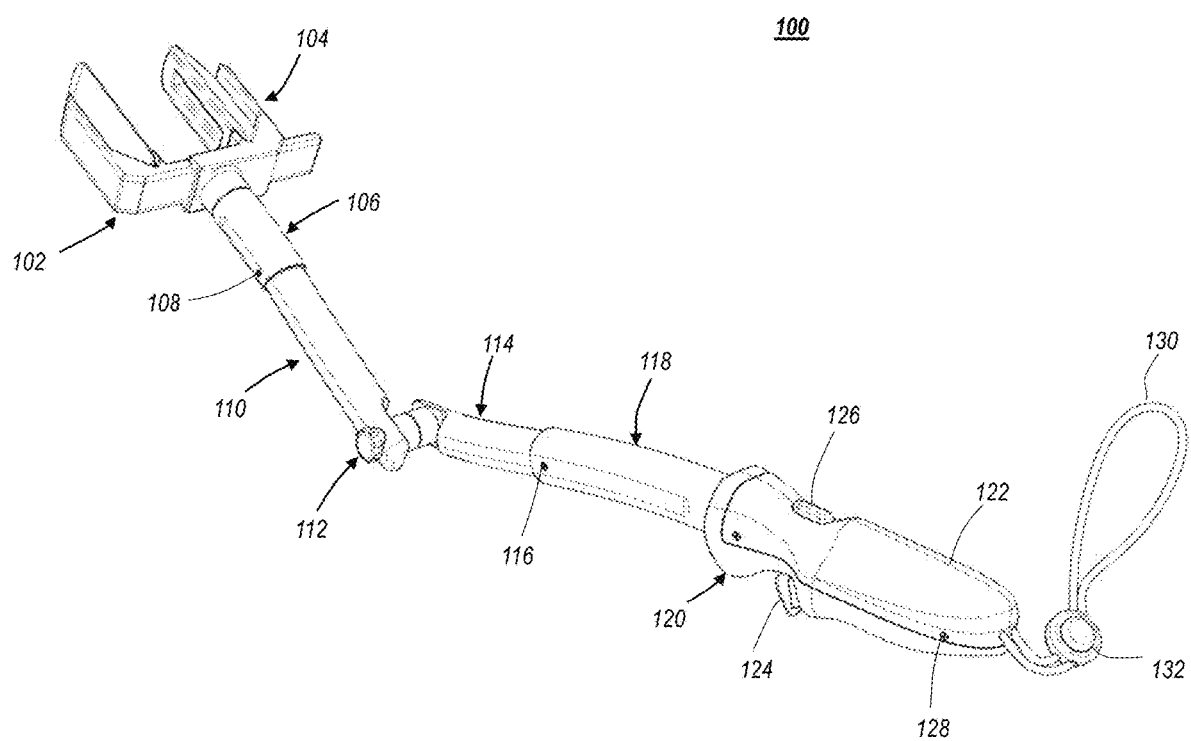
FIG. 8 is a rear left perspective view of a reach extending tool, in accordance with some embodiments.
Figure 9:
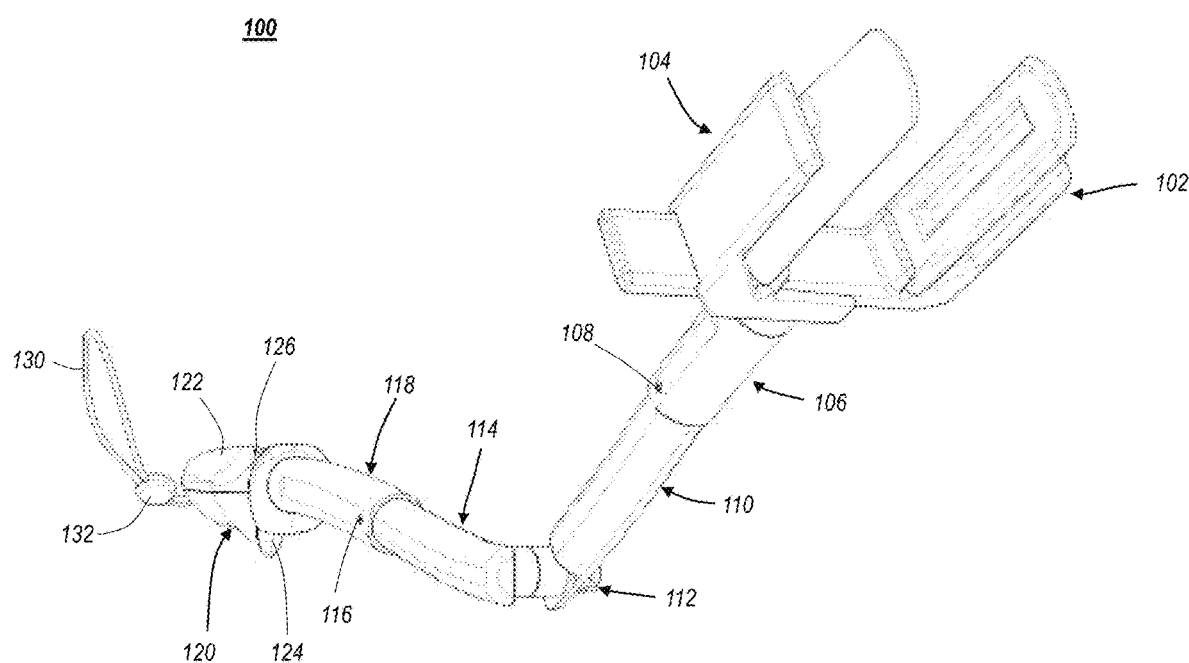
FIG. 9 is front right perspective view of a reach extending tool, in accordance with some embodiments.
Figure 10:
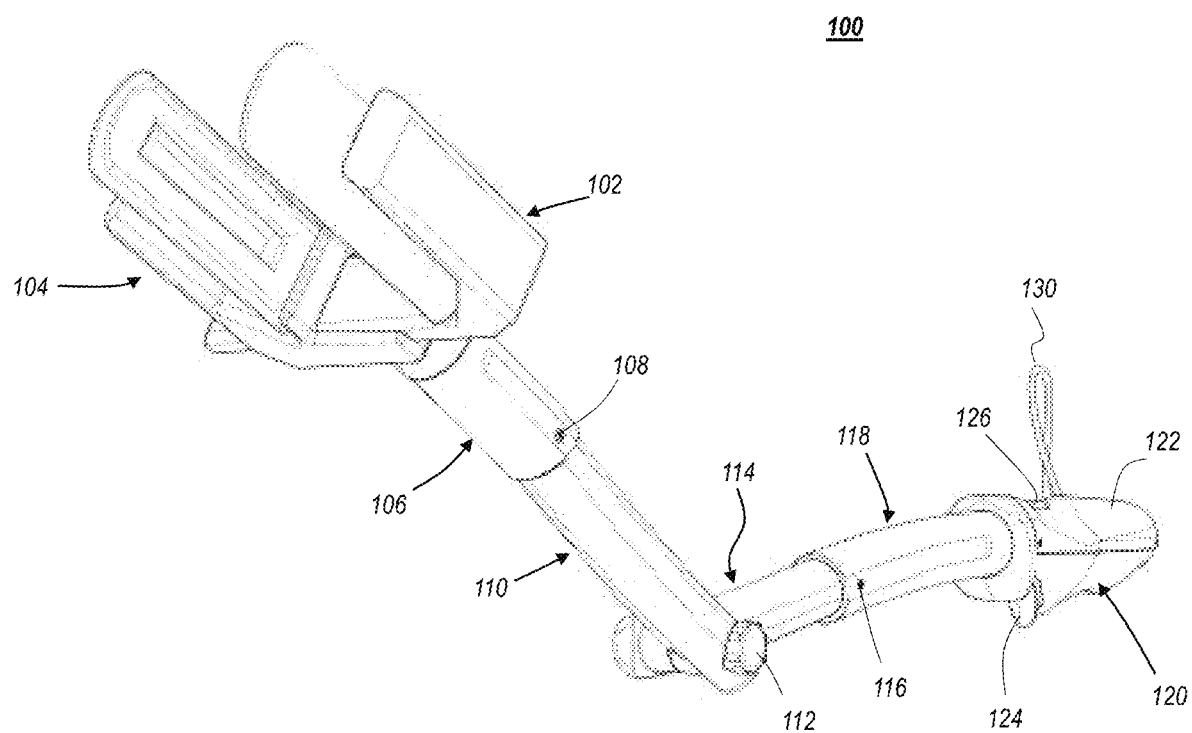
FIG. 10 is a front left perspective view of a reach extending tool, in accordance with some embodiments.

FIG. 1A is a left side elevational view of a reach extending tool 100 in accordance with some embodiments. FIG. 1A through FIG. 10 all describe and show the same exemplary embodiment of the reach extending tool 100, or detailed portions thereof, so reference can be made generally to these drawings, but particular ones of these drawings will be referred to in describing particular details. In FIGS. 1B-10, FIG. 1B shows a left side elevational view of a reach extending tool 100 indicating the articulation of the sections of the reach extending tool; FIG. 2 shows a top plan view of a reach extending tool 100, in accordance with some embodiments; FIG. 3 shows a detail top view of the grasping section 10 of the reach extending tool 100; FIGS. 4A and 4B show left and right bottom front perspective views, respectively, of the grasping section 10 of a reach extending tool 100; FIG. 5 shows an exploded view of the grasping portion 10 of the reach extending tool 100; FIG. 6 shows a front elevational view of a reach extending tool 100; FIG. 7 shows a rear right perspective view of a reach extending tool 100; FIG. 8 shows a rear left perspective view of a reach extending tool 100; FIG. 9 shows a front right perspective view of the reach extending tool 100; and FIG. 10 shows a front left perspective view of the reach extending tool 100, in accordance with some embodiments.

In general, the reach extending tool 100 is an elongated device having a grasping end 10 that is opposite a handle end 20 with a body section 30 in between. The body section 30 is comprised of two elongated sections 40, 50 that are coupled together at an elbow joint 60. Specifically, the proximal end of the body section 40 is coupled to the elbow joint 60, and the distal end of the second body section 50 is coupled to the elbow joint 60. The handle end 20 is at one end of body section 50, and the grasping end 10 is at a distal end of body section 40. The elbow joint 60 allows the two body sections 40, 50 to change the angle between them to a desired angle. The angle can range from zero degrees to one hundred eighty degrees, but the two body section can revolve a full three hundred sixty degrees relative to each other about the elbow joint 60. At zero degrees, the grasping end 10 and handle end 20 will be farthest from each other, and at one hundred eighty degrees the grasping end 10 and handle end 20 will be closest to each other and in fact directly next to each other. The positions of the two body sections 40, 50 relative to each other can be fixed at any angle in between those extremes, as desired by the user. Thus, the user can configure the tool 100 for maximum reach, or for storage, or for other uses where an angle in between is more useful. The ability of the two body portion 40, 50 to move is indicated by arrows 134, 136 in FIG. 1B. A knob 112 at the elbow joint 60 allows the user to tighten or loosen the elbow joint to allow a user to adjust the angle to a desired position, and then fix it by tightening the knob 112.

The grasping end 10 includes two parallel grasping extensions including a moveable grasping extension 102 and a fixed grasping extension 104. Fixed grasping extension 104 is attached to a first tube section 106 of the first body portion 40, such as by a collar portion 105 the first over a first end of the first tube section 106. Moveable grasping extension 102 is a moveable and can be controlled, at the handle end, to move relative to the fixed grasping extension 104. The first body portion further includes a second tube section 110 that is joined to the first tube section 106, such as by a screw 108 or other suitable fastener. The second tube section 110 forms part of the elbow joint 60. The second body portion 50 is comprised of a first tube section 114 that forms the other portion of the elbow joint 60 and is attached to the elbow joint portion of the second tubes section 110 of the first body portion 40. Further, the second body portion 50 includes a second tube section 118 that is coupled, in series (i.e. end to end in a generally straight line) to the first tube section 114 and fixed by a screw 116 or equivalent fastener. At the opposite end of the second tube section 118 of the second body portion 50 the second tube section 118 is coupled to a first handle section 120 of the handle portion 20. The first handle section 120 can be a lower handle section, and a second handle section 122 can be an upper handle section that attaches to the first handle section 120. A grasping trigger 124 allows a user to operate the moveable grasping extension 102 to move, while a locking button 126 olds the moveable grasping extension 102 in place. As will be described, the grasping trigger 124 and locking button 126 act on a cable that passes from the handle portion 20 through the second body portion 50, through the elbow joint 60, and through the first body portion 40 to the grasping portion 10. The lower and upper handle sections 120, 122 can be fastened together using, for example, screws such as screw 128. A lanyard 130 can be attached to the end of the handle portion 20, and can include a cinch 132 that can adjust the size of the loop in the lanyard 130.

FIGS. 3, 4A, 4B, and 5 shows detail views of the grasping section 10 of the reach extending tool 100, in accordance with some embodiments. As mentioned, there is a fixed grasping extension 104 and a moveable grasping extension 102. The fixed grasping extension 104 has a collar 105 that interfaces with the first tube section 106 of the first body portion 40. The collar 105 extends from a lateral support portion 146 of the fixed grasping extension 104. The lateral support portion 146 is an elongated portion of the fixed grasping section 104 that generally extends in a direction that is perpendicular to an axial direction of the first body portion 40, and particularly the axial direction of the first tubular section 106. The lateral support portion 146 extends to the side from the end adjoining the collar 105, and at the opposite end a fixed forward extending portion 140 extends at substantially a right angle to the lateral support portion 146 to make an "L" shaped between the forward ending portion 140 and the lateral support portion 146. The fixed forward extending portion 140 supports and holds a grasping pad 150. The movable grasping extension 102 likewise has a lateral section 144. The lateral section 144 passes through the fixed grasping section 104 in the direction of arrow 142, laterally, and is movable in the lateral direction in both directions. The lateral support portion 146 forms a channel 302 to guide lateral section 144 of the moveable grasping extension 102. As the lateral section 144 moves along the channel 302, it passes under a bridge 304 over the channel 302. The bridge 304 also helps to hold grasping pad 150 in place. The lateral section 144 is therefore divided into sections 142a and 142b; section 142a extends past the fixed forward extending portion 140 while section 142b is in the channel 302 and between the two grasping sections 102, 104. The proportion of these section 142a, 142b changes as the user adjusts the width between the grasping extensions 102, 104. The lateral section 144 adjoins a forward extending portion 138 in an "L" shape such that they are substantially perpendicular to each other. The forward extending portion 138 holds and supports a grasping pad 148. The grasping pads 148, 150 have opposing planar faces, meaning they face towards each other, and they are substantially parallel to each other. The opposing faces remain parallel throughout the range of movement of the moveable gasping extension 102. The pads 148, 150 can be made of a resilient material such as rubber to provide a high level of friction against objects that are grasped and held between the pads 148, 150. To facilitate the system in which the grasping end 10 is used to hold certain tools, the pads 148, 150 each have a recess 152, 154, respectively formed therein. These recesses 152, 154 are sized to receive protrusions on the sides of tool elements, as will be described.

Figure 15:
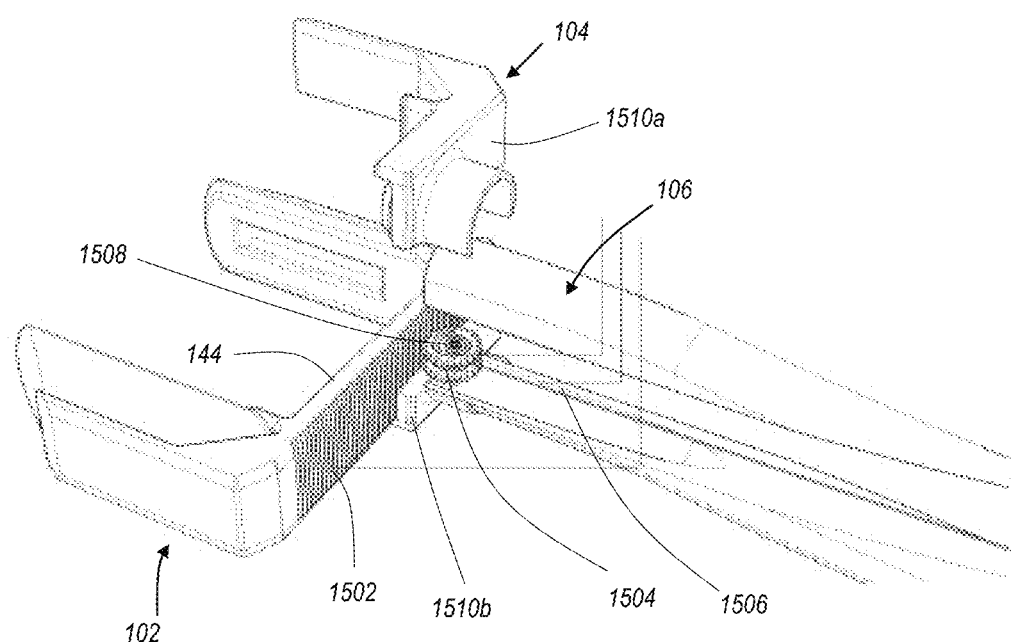
FIG. 15 shows a partial exploded perspective view of the grasping portion, in accordance with some embodiments.

FIG. 5 shows the moveable grasping extension 102 separate from the fixed grasping extension 104, as would be seen during assembly or manufacture of the reach extending tool 100. As can be seen, the lateral portion 144 of the moveable grasping extension is placed into the channel 302 in lateral support portion 146 of the fixed grasping extension 104. The channel 302 includes a tunnel portion where the lateral portion 144 will be bounded on all sides by the fixed grasping extension 104, which prevents twisting and tilting of the moveable grasping extension 102 relative to the fixed grasping extension 104. Referring to FIG. 15, it can be seen that, in some embodiments, the bottom side of the lateral portion 144 includes a series of ridges 1502 that are oriented to be perpendicular to the direction of movement of the lateral portion 144 of the movable grasping extension 102 as it moves through the fixed grasping extension 104. A first half 1510a of the fixed grasping extension 104 has been moved outward to expose the view inside the fixed grasping extension 104, which houses a gear 1504 that engages the ridges 1502. The gear 1504 can be sprung using a coil spring 1508 that urges the gear to rotate in a direction that will cause the gear to move the moveable grasping extension 102 away from the fixed grasping extension 104. A cord 1506 is wound around the gear 1504 and can be pulled to cause the gear 1504 to rotate against the urging of the coil spring 1508 to move the moveable grasping extension 102 toward the fixed grasping extension 104.

Figure 16:
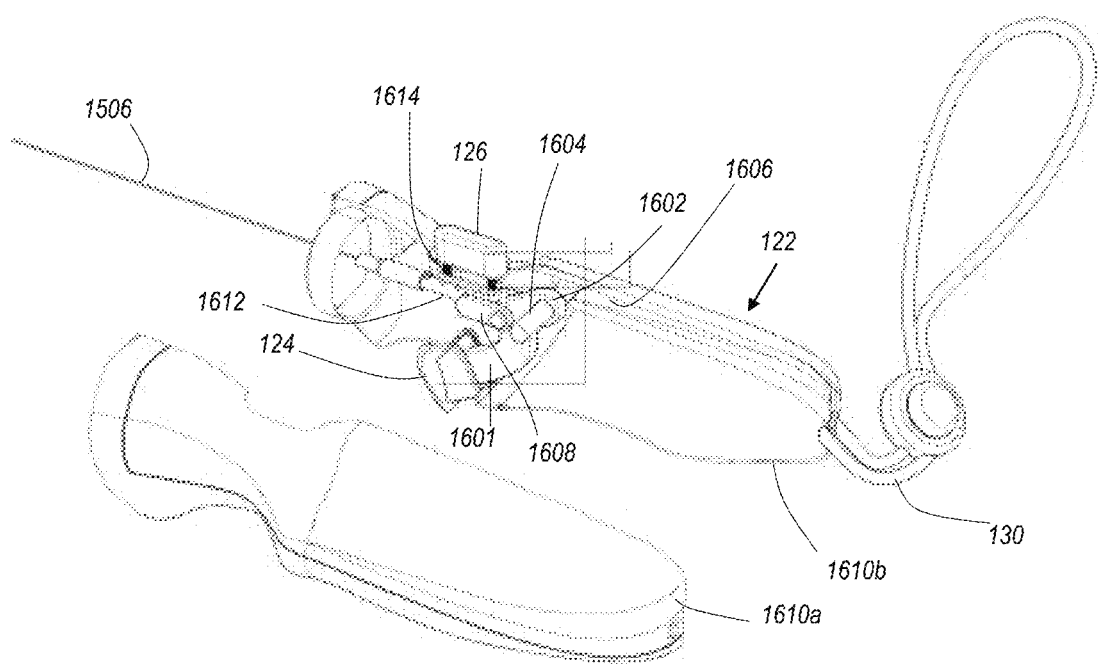
FIG. 16 shows a partial exploded perspective view of the handle portion, in accordance with some embodiments.

FIG. 16 shows a perspective exploded view of the handle portion 20 in which the opposite end of the cord 1506 is shown meeting an exemplary mechanism for pulling and holding the cord 1506 to adjust the distance between the grasping extensions 102, 104. The cord 1506 (or cable) snakes through the interior of the body portions, 40, 50 and through the elbow joint 60 to join the gear 1504 to the trigger 124. The trigger 124 is coupled to a mechanism inside the handle 122, which includes handle portions 1610a and 1610b which join together to form the handle 122. Inside the handle 122 the trigger 122 is coupled to a transverse guide 1604 at an upper end 102 of the trigger arm 1601. The transverse guide 1604 extends outward from the trigger arm 1601 at the upper end 1602 and the outer ends of the transverse guide 1604 are disposed in guide grooves 1606. The guide grooves 1606 run in a direction along the handle, from the front of the handle to the back, where the lanyard 130 is attached. A link 1608 connects the trigger arm 1601 to the catch 1612 which is attached to the end of the cord 1506. The catch 1612 has several retention features, such as holes into which pins or protrusions 1614 on the bottom of the locking button 126. Thus, the trigger 124 is pressed by a user to move the catch towards the back end of the handle 122, and the locking button is pressed to engage the ins 1614 into the openings in the catch, thereby retaining the catch 1612. The trigger and link 1608 can operate in a ratcheting manner so that the catch 1608, and the cord 1506, can be ratcheted to the move the moveable grasping extension 102 closer and closer to the fixed grasping extension 104. The user can then lock the position of the moveable grasping extension 102 when it is closed to the desired distance relative to the fixed grasping extension 104. Thus, the user can grasp objects by placing the moveable and fixed grasping extensions 102, 104 on opposite sides of the object, and then manipulating the trigger 124 until the grasping pads 148, 150 make contact with the opposite sides of the object and apply sufficient pressure to hold the object as it is lifted while held between the grasping pads 148, 150. At that point, the locking button 126 can be depressed to engage the catch 1612 so that the user does not have to maintain pressure on the trigger 124.

Figure 11:
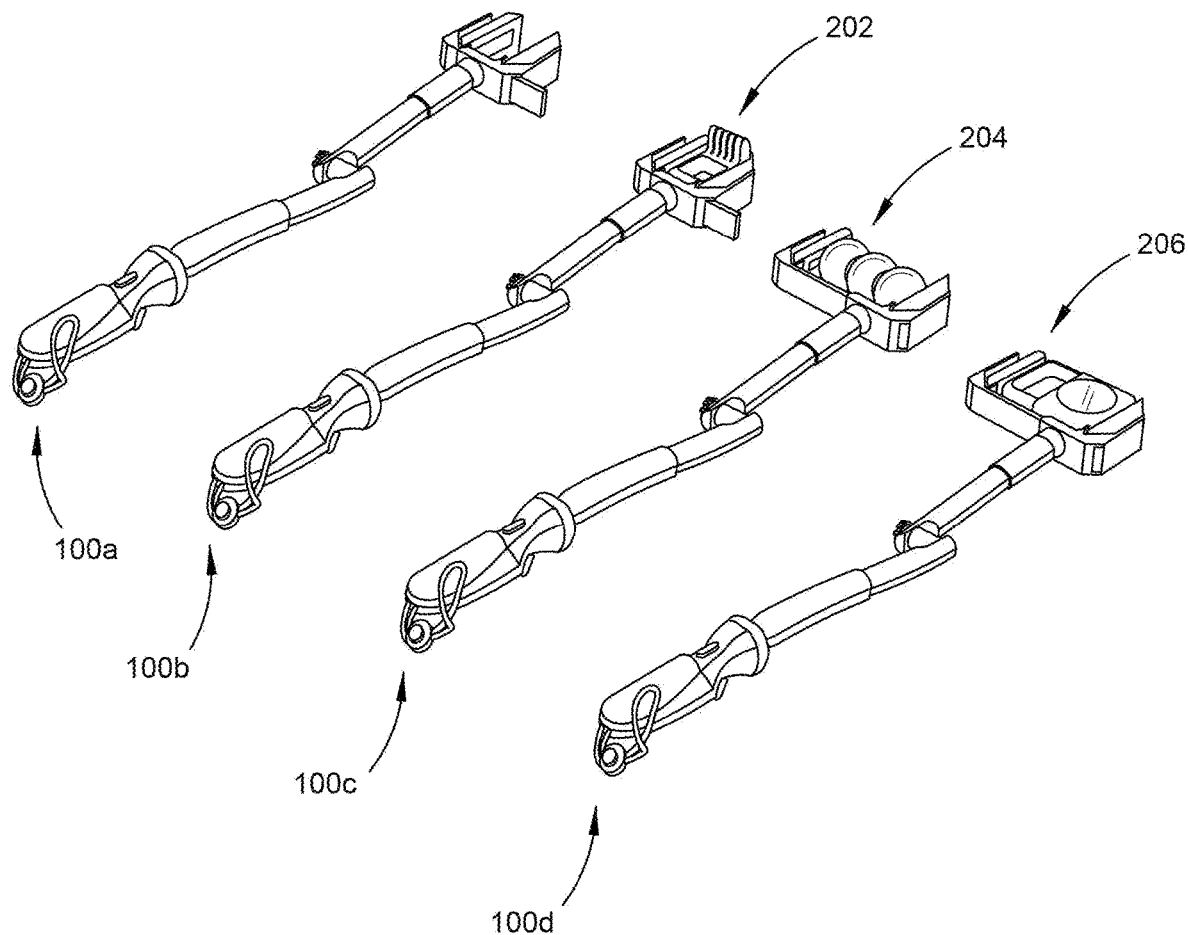
FIG. 11 shows a plurality of reach extending tools, including different tools for use in the grasping section, in accordance with some embodiment.
Figure 12:
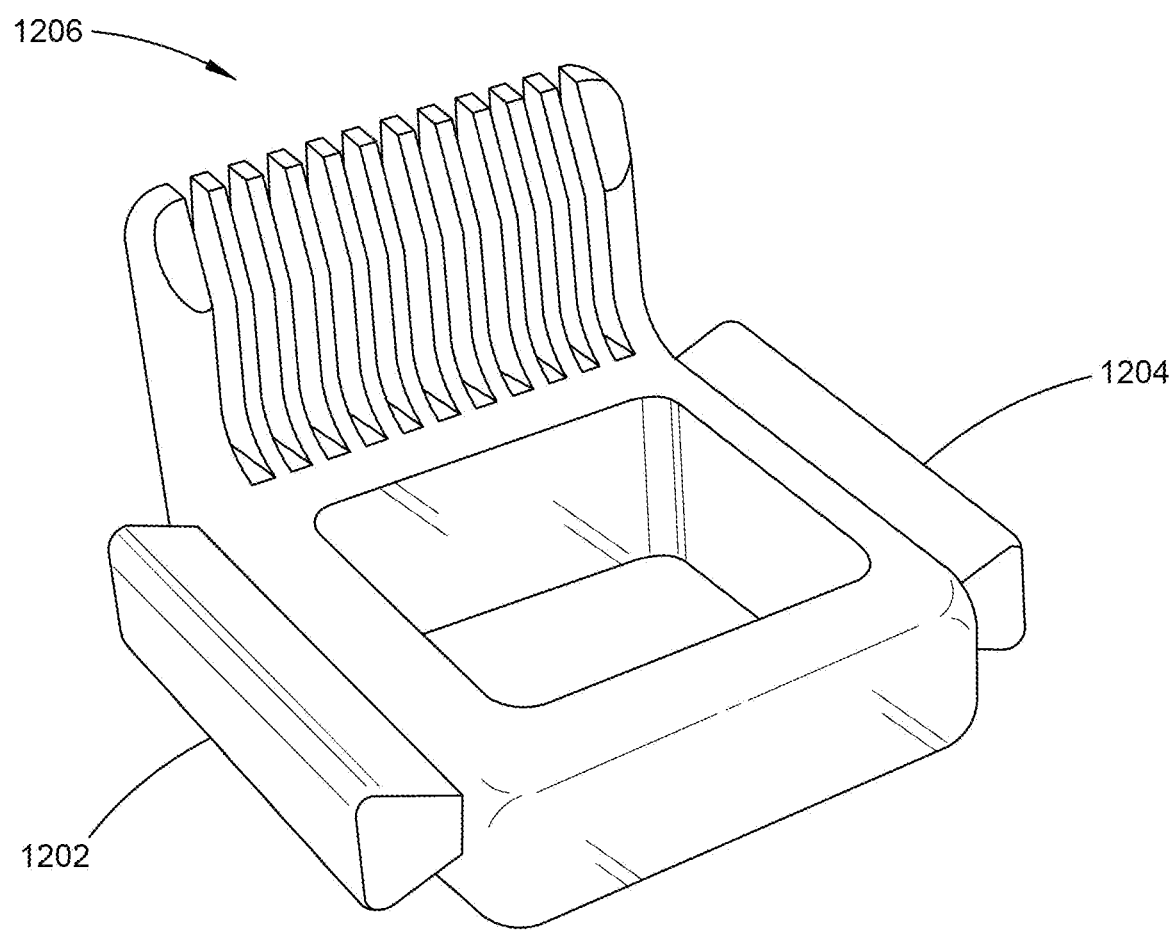
FIG. 12 shows a back scratcher tool for use in the grasping section of a reach extending tool, in accordance with some embodiments.
Figure 13:
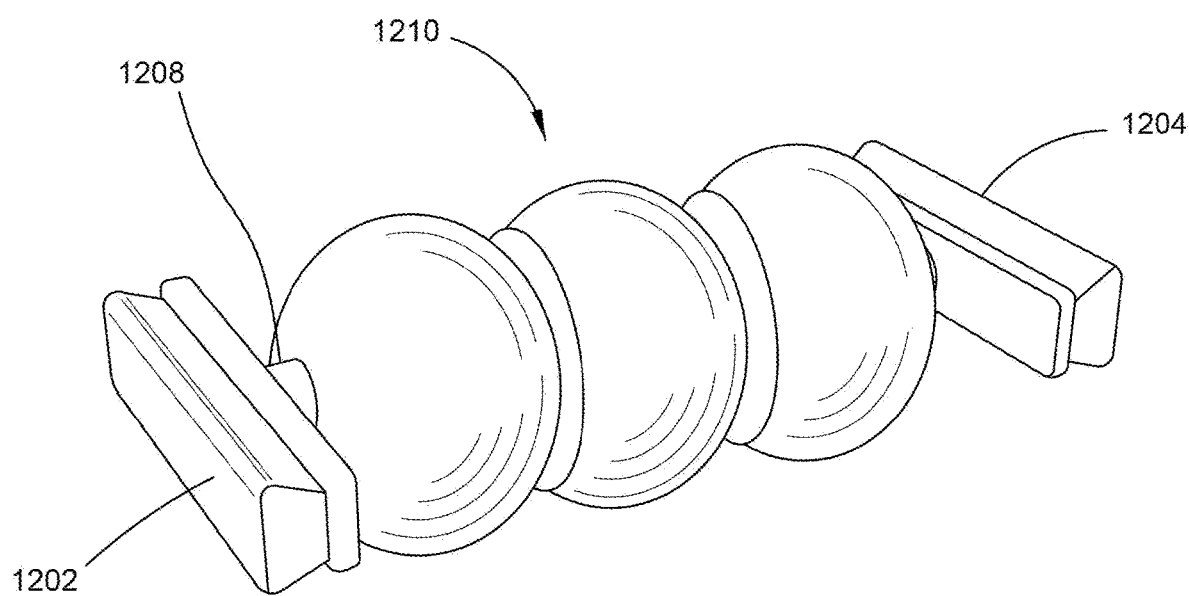
FIG. 13 shows a massager tool for use in the grasping section of a reach extending tool, in accordance with some embodiments.
Figure 14:
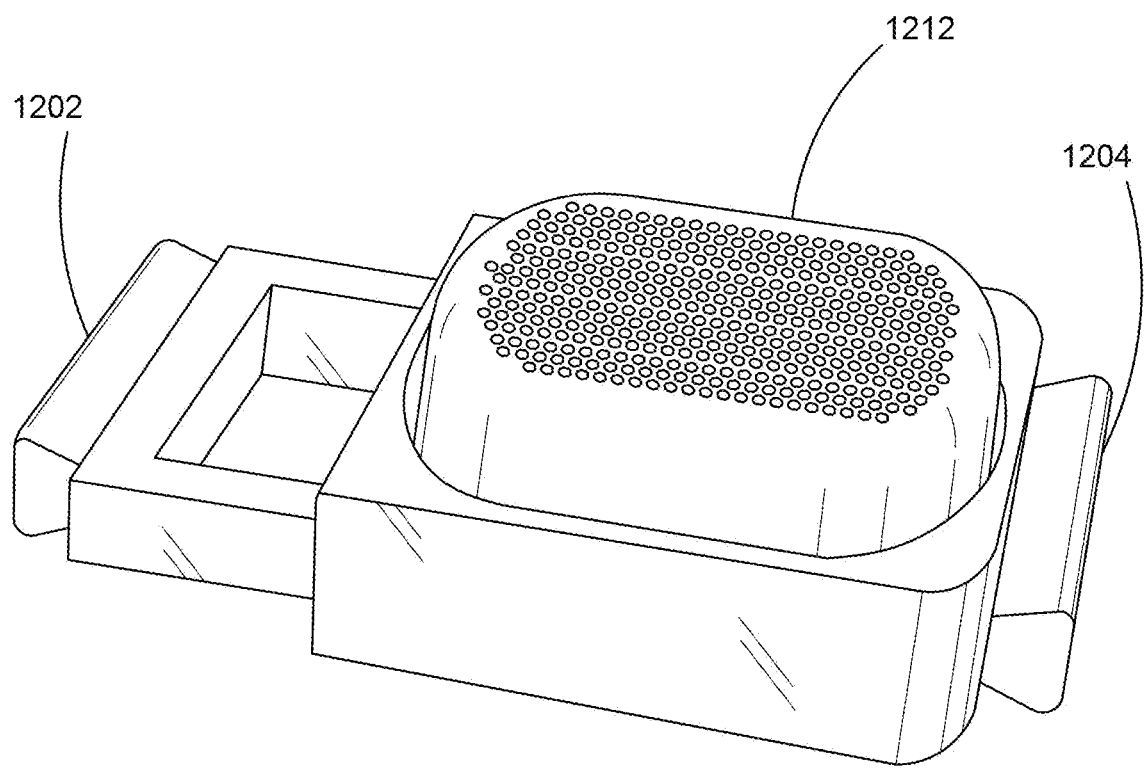
FIG. 14 shows a lotion applicator tool for use in the grasping section of a reach extending tool, in accordance with some embodiments.

FIG. 11 shows a plurality of reach extending tools 100a-100d, some including different tools for use in the grasping section, in accordance with some embodiments. The reach extending tools 100a-100d can be substantially similar to reach extending tool 100 shown in FIGS. 1-10, and 15-16. Reach extending tool 100a has nothing it its grasping section and can be used to pick up other objects. Tool 100b is shown holding a back scratcher 202, tool 100c is holding a massager 204, and tool 206 is holding a lotion applicator 206. These accessories 202-206, and others like them, form a system with the reach extending tool 100. That is, the reach extending tool 100 can be provided together with several of the accessories. FIG. 12 shows a back scratcher accessory 202, FIG. 13 shows a massager accessory 204, and FIG. 14 shows a lotion applicator accessory 206, each accessory being configured for use in the grasping section of a reach extending tool, in accordance with some embodiments. In particular, each of the accessories 202-206 have sides parallel protrusions 1202, 1204 on opposite sides of the tools 202-206. The protrusions or plugs 1202, 1204 are sized to fit into the recesses 152, 154 of the grasping pads 148, 15, respectively. Thus, a user can position one of the accessories 202-26 between the grasping extensions 102, 104 of the reach extending tool 100, then manipulate the trigger 122 to move the moveable grasping extension to close the distance between the grasping pad 148 of the moveable grasping extension 102 toward rasping pad 150 of the fixed grasping extension 10 until the protrusions 1202, 1204 are seating in the recesses 152, 154. The locking button 124 can then be pressed to lock the position of the fixed grasping extension 102. Then users can configure the angle of the body portions 40, 50 at the elbow joint 60 of their reach extending tool to a desired angle for using their particular accessory 202-206 on themselves. The back scratcher accessory 202 includes a plurality of tines 1206 that form a comb-like structure that extend perpendicularly to the plane defined between the protrusions 1202, 1204. The massage accessory 204 includes rolling member 1210 mounted on a rod 1208 between the protrusions 1202, 1204. The rolling member 1210 can turn or spin on the rod 1208 and includes several rounded ridges that a person can apply, for example, to their back muscles, along their spine, for example, using the reach extending tool 100. The rolling member 1210 can be rolled over portions of their back to reduce tension in the muscles. The lotion applicator accessory 206 can include a porous pad 1212 to which the user can apply lotion or other fluid material, and, using the reach extending tool with the lotion applicator accessory in the grasping section 10, then apply the lotion to portions of their body they cannot otherwise reach.

A reach extending tool and a system of accessories has been disclosed that allow a user to grasp objects they could not otherwise easily reach, and to apply certain self-care modalities to themselves. The reach extending tool includes a grasping portion opposite a tubular body from a handle portion. However, the tubular body includes two portions joined by an elbow joint that allows adjustment of the body portions relative to each other to allow the user to reach various parts of their body with the accessories, as may be desired. The accessories are configured to be held between the grasping extensions and then applied to a hard to reach body region by the user.

The claims appended hereto are meant to cover all modifications and changes within the scope and spirit of the present invention.

What is claimed is:

1. A reach extending tool system, comprising:
   a body section having a grasping end opposite a handle end;
   a fixed grasping extension attached to the body section at the grasping end of the body section and which is fixed to the body section at the grasping end,
   a moveable grasping extension at the grasping end of the body section that is moveable relative to the fixed grasping extension;
   a handle at the handle end including a trigger that is operable coupled to the moveable grasping extension wherein the moveable grasping extension moves toward the fixed grasping extension when the trigger is pulled; and
   wherein the fixed grasping extension and the movable grasping extension each comprise a grasping pad, each grasping pad having a face that is planar, and wherein the face of the grasping pad on the fixed grasping extension and the face of the grasping pad on the moveable extension oppose each other and are parallel, and wherein the faces remain parallel throughout a range of movement of the moveable grasping pad.

2. The reach extending tool of claim 1, wherein the body section includes a first section and a second section joined at an elbow joint.

3. The reach extending tool of claim 2, wherein the elbow joint includes a knob that can tighten the elbow joint to fix the first section and second section in position relative to each other, and which can also be loosened to allow the first section and the second section to move relative to each other at the elbow joint.

4. The reach extending tool of claim 1, wherein the handle end includes a locking button operable, when pressed, to hold the moveable grasping extension in place.

5. The reach extending tool of claim 1, wherein each of the grasping pads includes a recess formed in its face, wherein the recess is configured to hold a protrusion of an accessory therein.

6. The reach extending tool of claim 1, further comprising a cable disposed in the body section between the trigger and a gear at the grasping end that engages the moveable grasping section, wherein the trigger operates movement of the gear through the cable to cause the moveable grasping portion to move.

7. A reach extending tool system, comprising:
   a reach extending tool having:
   a body section including a first section and a second section; the body section having a grasping end and a handle end opposite the grasping end, the first section and second section being joined together at an elbow joint between the handle end and the grasping end, wherein the elbow joint selectively allows the first section and second section to move relative to each other about the elbow joint and to be fixed to each other so that the first section and the second section do not move relative to each other;
   a fixed grasping extension that is mounted at the grasping end at a lateral support portion of the fixed grasping extension, the fixed grasping extension further having a forward extending portion that extends from the lateral support portion at a right angle, a grasping pad mounted on the forward extending portion, the gasping pad having a recess formed in a face of the grasping pad;
   a moveable grasping extension that has a lateral section that is mounted in the lateral support portion of the fixed grasping extension, a forward extending portion extending from the lateral section at a right angle to the lateral section and parallel to the forward extending portion of the fixed grasping extension, a grasping pad mounted on the forward extending portion of the moveable grasping extension, the grasping pad having a recess formed in a face of the grasping pad, and wherein the face of the grasping pad of the moveable grasping extension is parallel with the face grasping pad of the fixed grasping extension, a recess formed in the face of the grasping pad of the moveable grasping extension upon being pressed;
   a trigger at the handle end that is operably coupled to the grasping end and is operable to move the moveable grasping extension toward the fixed grasping extension; and
   at least one accessory configured to be held between the grasping pad of the fixed grasping extension and the grasping pad of the moveable grasping extension, including a protrusion on a first side of the at least one accessory that fits into the recess of one of the grasping pads and a protrusion at an opposite side of the at least one accessory that fits into the recess of the other grasping pad.

8. The reach extending tool of claim 7, wherein the at least one accessory is a back scratcher having a plurality of tines that extend from a body of the back scratcher.

9. The reach extending tool of claim 7, wherein the at least one accessory is a massager having a roller.

10. The reach extending tool of claim 7, wherein the at least one accessory is a lotion applicator.

\* \* \* \* \*